United States Patent
Leisten et al.

(10) Patent No.: US 11,671,006 B2
(45) Date of Patent: *Jun. 6, 2023

(54) POWER FACTOR CORRECTION BOOST CONVERTER HAVING AN ON-TIME RESPONSIVE TO NEGATIVE CURRENT

(71) Applicant: TEXAS INSTRUMENTS INCORPORATED, Dallas, TX (US)

(72) Inventors: Joseph Michael Leisten, Cork (IE); Salvatore Giombanco, Cassaro (IT); Filippo Marino, Tremestieri Etneo (IT); Rosario Davide Stracquadaini, San Gregorio di Catania (IT)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 130 days.

This patent is subject to a terminal disclaimer.

(21) Appl. No.: 17/232,974

(22) Filed: Apr. 16, 2021

(65) Prior Publication Data

US 2021/0234458 A1 Jul. 29, 2021

Related U.S. Application Data

(62) Division of application No. 16/221,419, filed on Dec. 14, 2018, now Pat. No. 11,011,975.

(60) Provisional application No. 61/632,478, filed on Jan. 24, 2012.

(51) Int. Cl.
*H02M 1/42* (2007.01)
*H02M 1/32* (2007.01)
*H02M 1/00* (2006.01)

(52) U.S. Cl.
CPC ....... *H02M 1/4225* (2013.01); *H02M 1/0038* (2021.05); *H02M 1/32* (2013.01)

(58) Field of Classification Search
CPC ..... H02M 1/4225; H02M 3/155–1588; H02M 1/0038; H02M 1/32
See application file for complete search history.

(56) References Cited

U.S. PATENT DOCUMENTS

| | | | |
|---|---|---|---|
| 4,683,529 A * | 7/1987 | Bucher, II | ........... H02M 3/1563 363/44 |
| 5,420,780 A | 5/1995 | Bernstein | |
| 6,137,696 A | 10/2000 | Hall | |
| 6,285,170 B1 | 9/2001 | Matsumoto | |
| 2004/0160128 A1 | 8/2004 | Athari | |
| 2008/0232144 A1 | 9/2008 | Klein | |
| 2010/0002474 A1 | 1/2010 | Moon | |
| 2010/0118573 A1 | 5/2010 | Saint-Pierre | |

(Continued)

*Primary Examiner* — Peter M Novak
(74) *Attorney, Agent, or Firm* — Ray A. King; Frank D. Cimino (57) ABSTRACT

In an example, a system comprises a boost power factor correction (PFC) converter that includes a thermistor, an inductor, and a transistor and a PFC controller coupled to a common node. The PFC controller includes a comparator coupled to a threshold voltage source and to a terminal of the transistor. A first flip-flop is coupled to the comparator and to a control terminal of the transistor. A zero current detector is coupled to the inductor. A timer is coupled to the comparator and to the zero current detector. A second flip-flop is coupled to the timer and to the control terminal of the transistor. An AND gate is coupled to the first and second flip-flops. The circuit includes third and fourth flip flops.

14 Claims, 7 Drawing Sheets

(56) References Cited

U.S. PATENT DOCUMENTS

| | | |
|---|---|---|
| 2013/0342139 A1 | 12/2013 | Shimomugi |
| 2014/0043005 A1* | 2/2014 | Ide .................... H02M 1/32 323/285 |
| 2014/0272649 A1 | 9/2014 | Hashim |
| 2016/0285358 A1 | 9/2016 | Ohtake |
| 2017/0294908 A1 | 10/2017 | Kawamoto |

* cited by examiner

POWER FACTOR CORRECTION BOOST CONVERTER HAVING AN ON-TIME RESPONSIVE TO NEGATIVE CURRENT

CROSS-REFERENCE TO RELATED APPLICATIONS

This application is a divisional of prior application Ser. No. 16/221,419, filed Dec. 14, 2018, now U.S. Pat. No. 11,011,975;

and claims priority to U.S. Provisional Patent Application No. 62/632,478, which was filed Feb. 20, 2018, is titled "Second Level Output Over-Voltage And HV Power Switch Protection Device And Method Of Operating The Same," and is hereby incorporated herein by reference in its entirety.

SUMMARY

In an example, a system comprises a boost power factor correction (PFC) converter including a thermistor, an inductor, and a transistor coupled to a common node. The system also comprises a PFC controller coupled to the common node. The PFC controller includes a comparator coupled to a threshold voltage source and to a non-control terminal of the transistor. A first flip-flop is coupled to the comparator and to a control terminal of the transistor. A zero current detector is coupled to the inductor. A timer is coupled to the comparator and to the zero current detector. A second flip-flop is coupled to the timer and to the control terminal of the transistor. An AND gate is coupled to the first and second flip-flops. A third flip-flop is coupled to the second flip-flop and to the control terminal of the transistor. A fourth flip-flop is coupled to the AND gate and to the control terminal of the transistor.

In an example, a system comprises a boost power factor correction (PFC) converter comprising a thermistor, an inductor, and a transistor coupled to a common node. The system also includes a PFC controller coupled to the common node and configured to determine whether a current through the inductor reaches approximately zero within a predetermined amount of time after a voltage at the common node drops below a threshold.

In an example, a system comprises a comparator having a first input configured to receive a voltage of a non-control terminal of a transistor, a second input configured to receive a threshold voltage, and an output. The system also includes a first flip-flop having a set input coupled to the output of the comparator, a data input configured to receive a low signal, an inverting clock input coupled to a control terminal of the transistor, and an output. The system also includes a timer having an inverting enable input coupled to the output of the comparator, a clear input coupled to a zero current detector, and an output. The system also includes a second flip-flop having a set input coupled to the output of the timer, a data input configured to receive a low signal, an inverting clock input coupled to the control terminal of the transistor, and an inverting output. The system also includes an AND gate having a first input coupled to the output of the first flip-flop, a second input coupled to the inverting output of the second flip-flop, and an output. The system also includes a third flip-flop having a data input coupled to the output of the first flip-flop, a clock input coupled to the control terminal, and an output. The system also includes a fourth flip-flop having a data input coupled to the output of the AND gate, a clock input coupled to the control terminal, and an output.

BRIEF DESCRIPTION OF THE DRAWINGS

For a detailed description of various examples, reference will now be made to the accompanying drawings in which.

DETAILED DESCRIPTION

The power factor of an alternating current (AC) electrical power system is defined as the ratio of the real power absorbed by the load to the apparent power flowing in the circuit. Electrical systems with power factors less than 1.0 suffer from inefficiencies that negatively impact performance of the electronic device in which the power system is implemented as well as the performance of the power grid. These inefficiencies can potentially be corrected. Certain types of power converters are useful to improve power factors. One such type of power converter is the boost power factor correction (PFC) converter, which contains a switch that is rapidly turned on and off with a variable duty cycle to make the input current become sinusoidal and in phase with the input voltage. Boost PFC converters typically contain an AC source, a rectifier, an inductor, one or more filtering or smoothing capacitors, a diode, and the aforementioned switch.

One problem commonly encountered in boost PFC converters occurs when the converter is first turned on. At this time, a large inrush current flows through the converter from the AC source. This current is undesirable for a variety of reasons, among which is the fact that such high levels of current can potentially damage the converter. To overcome this problem, a thermistor is sometimes positioned in the current path of the converter to mitigate the inrush current. When the converter is first turned on and is cold, the thermistor provides a high resistance, and once the converter has warmed up and the risk of a large inrush current is low, the resistance of the thermistor decreases.

A drawback of using such thermistors is that during initial operation of the converter, the voltage across the thermistor can reach high levels. Such high voltages can, for example, damage the transistor switch of the converter. Thus, it would be useful to monitor the voltage at the thermistor and to take preventive action when the voltage becomes unacceptably high. However, high voltages at the thermistor can represent different conditions that call for different preventive measures. For example, in some cases, a high thermistor voltage can represent an overvoltage condition that is potentially damaging and that should be addressed by, e.g., turning off the converter and/or adjusting the duty cycle of the transistor switch. In other cases, a high thermistor voltage can represent a transient condition that occurs during initial operation of the converter (known as a cold start condition) and that could be addressed merely by adjusting the duty cycle of the transistor switch. The ability to distinguish between these two cases would be useful.

This disclosure describes various examples of a boost PFC converter system that is configured to distinguish between genuine overvoltage conditions and transient high voltage conditions (also referred to as cold start conditions). Advantages provided by such a boost PFC converter system include the ability to accurately diagnose high voltage situations and to take appropriate action to mitigate damage to the boost PFC converter system, the electronic device containing the converter system, and to the power grid. Other PFC converter systems are not equipped to accurately distinguish between true overvoltage conditions and cold start conditions and, therefore, are not equipped to effectively and efficiently take preventive measures to mitigate damage to the converter system.

In some examples, the boost PFC converter system described herein includes a boost PFC converter and a PFC controller coupled to a node between an inductor and a thermistor in the boost PFC converter. The PFC controller is configured to determine whether a current through the inductor reaches approximately zero within a predetermined amount of time after a voltage at the node drops below a threshold. If the current reaches approximately zero within the predetermined amount of time, the PFC controller outputs signals indicating that the converter is in a true overvoltage condition, and it takes appropriate mitigating steps, such as reducing switching duty cycle and/or turning off the converter for an extended, predetermined period of time. Otherwise, if the current does not reach approximately zero within the predetermined amount of time, the PFC controller outputs signals indicating that the converter is in a cold start condition, and the PFC controller may reduce the duty cycle. Other situations are possible, for example, the PFC controller determining that the voltage at the node does not exceed the threshold, in which case the controller does not take mitigating action. In this way, the PFC controller described herein mitigates the problems described above.

Figure 1:
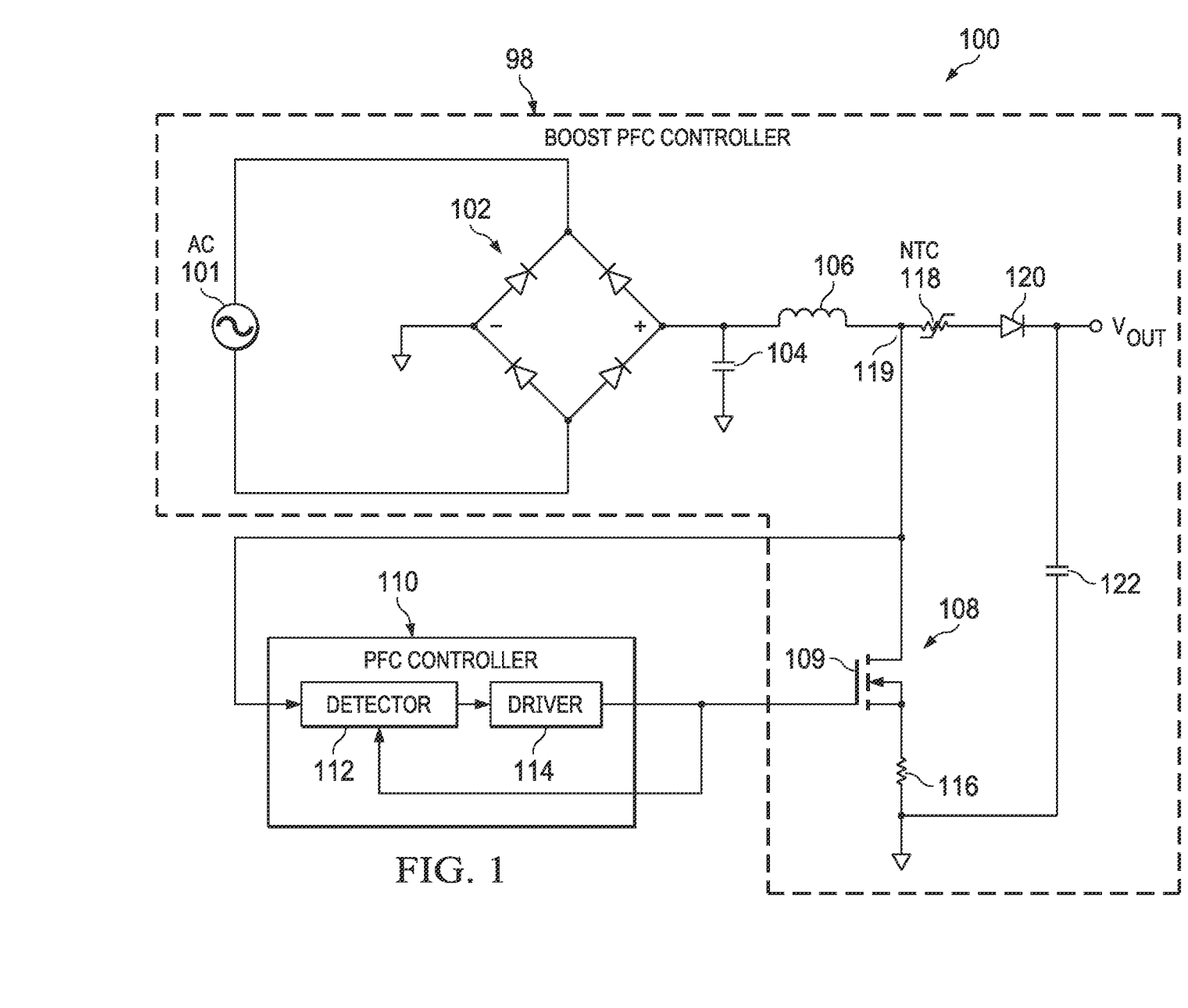
FIG. 1 is a circuit diagram of a boost power factor correction (PFC) converter system, in accordance with an example.

FIG. 1 is a circuit diagram of a boost power factor correction (PFC) converter system 100, in accordance with an example. The boost PFC converter system 100 includes a boost PFC converter 98 and a PFC controller 110. The boost PFC converter 98 comprises an AC source 101 coupled to a rectifier 102, a capacitor 104 coupled to the rectifier 102, an inductor 106 having a lead coupled to the capacitor 104, the inductor 106 having another lead coupled to a common node 119, a thermistor 118 having a lead coupled to the node 119, a diode 120 coupled to the thermistor 118, and a capacitor 122 coupled to the diode 120. The boost PFC converter system 100 also comprises a switch 108, such as a transistor (e.g., metal oxide semiconductor field effect transistor (MOSFET)). For purposes of the remainder of this description, the switch 108 is assumed to be a MOSFET. A drain of the MOSFET 108 is coupled to the node 119. A source of the MOSFET 108 couples to a resistor 116, which, in turn, couples to the capacitor 122. The rectifier 102, capacitor 104, and resistor 116 couple to ground. The diode 120 couples to an output node VOUT.

The boost PFC converter system 100 further comprises a PFC controller 110. An input to the PFC controller 110 couples to the node 119. An output of the PFC controller 110 couples to a gate 109 of the MOSFET 108. (The gate of the MOSFET 108 is sometimes referred to herein as a control terminal, and the drain and source of the MOSFET 108 are sometimes referred to herein as non-control terminals.) The PFC controller 110 comprises a detector 112 coupled to the node 119 and to a driver 114. The driver 114 couples to the gate 109.

In operation, the AC source 101 produces an AC signal that is rectified by the rectifier 102 to produce a rectified signal that is smoothed by the capacitor 104. The inductor 106 builds up charge based on the current provided from the rectifier 102. When the MOSFET 108 is on, the current in the inductor 106 increases. When the MOSFET 108 is off, current flows through the thermistor 118 and the diode 120 and current in the inductor 106 decreases. An output voltage is provided at the output node VOUT. The thermistor 118 mitigates large inrush currents at startup. The diode 120 prevents current flow when the voltage at the anode is low relative to the output voltage at the output node VOUT. The capacitor 122 is a filtering capacitor. The resistor 116 is optional and is usable to, e.g., monitor current flow through the MOSFET 108.

The detector 112 monitors the voltage at the node 119. When the detector 112 determines that the voltage at the node 119 has dropped below a threshold voltage, the detector 112 starts a timer to measure a predetermined amount of time. If the detector 112 determines that the current flowing through the inductor 106 reaches approximately zero within that predetermined amount of time from the time the voltage at the node 119 drops below the threshold voltage, the detector 112 recognizes a genuine overvoltage condition and takes appropriate action to protect the converter system 100. For example, the detector 112 outputs one or more signals to the driver 114 that cause the driver 114 to shut off the MOSFET 108 for an extended period and/or to manipulate the MOSFET 108 so as to reduce the duty cycle of the converter system 100. If the detector 112 determines that the current flowing through the inductor 106 reaches approximately zero after that predetermined amount of time, the detector 112 recognizes a transient cold start condition and takes appropriate action. For example, the detector 112 outputs one or more signals to the driver 114 that cause the driver 114 to manipulate the MOSFET 108 so as to reduce the duty cycle of the converter system 100. If the voltage at the node 119 does not exceed the threshold voltage, the detector 112 takes no mitigating action. If the voltage at the node 119 exceeds the threshold and remains above the threshold, the detector 112 causes the driver 114 to shut off the MOSFET 108 and/or to manipulate the MOSFET 108 so as to reduce the duty cycle of the converter system 100. As used herein, approximately zero current can refer to a current through an inductor of a level that would trigger a zero current detector. It can refer to a current that is between −5 mA and +5 mA, inclusive. It can refer to a current that is between −1 mA and +1 mA, inclusive.

Figure 2:
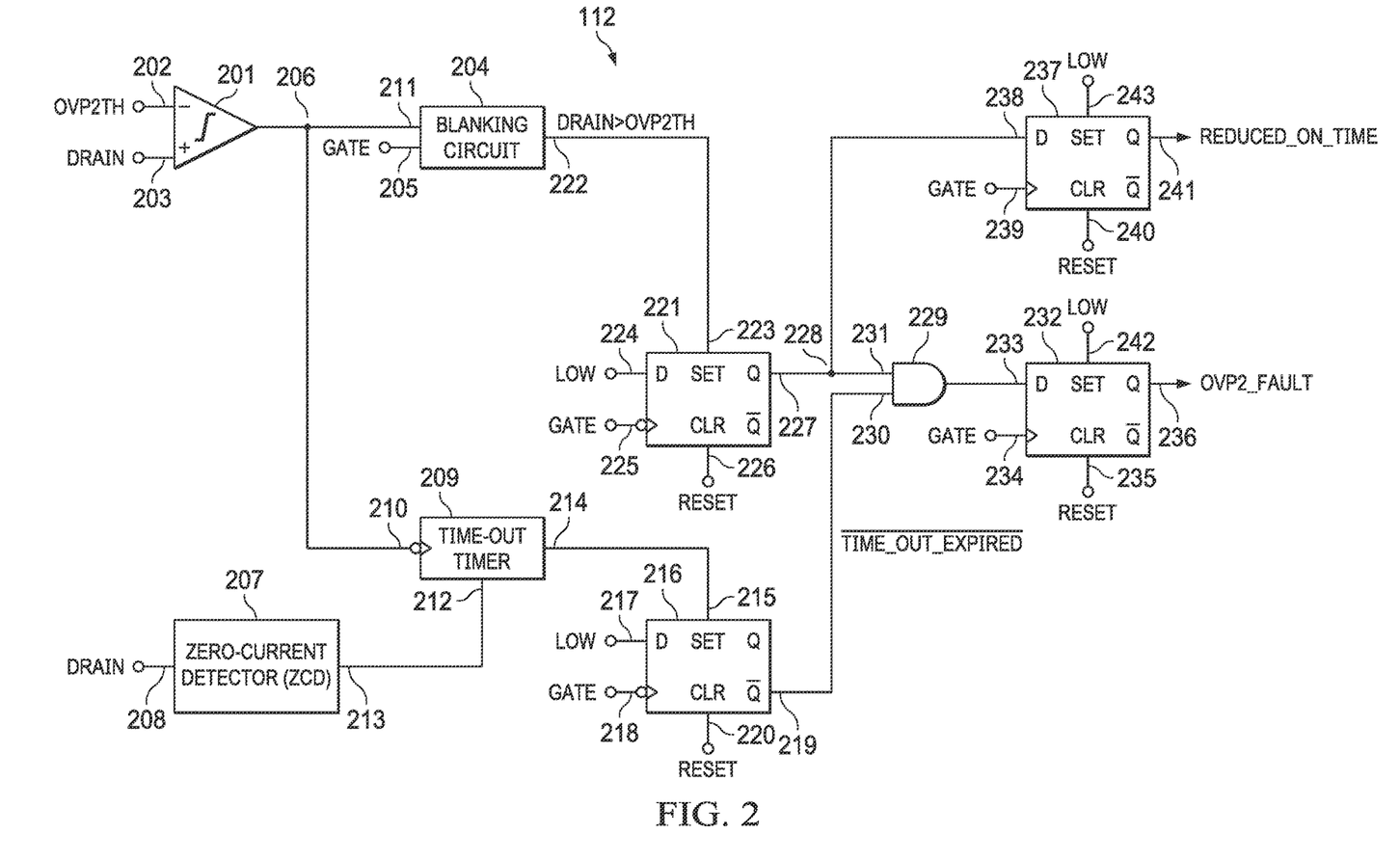
FIG. 2 is a circuit diagram of a boost PFC controller detector, in accordance with an example.

FIG. 2 is a circuit diagram of the PFC controller detector 112, in accordance with an example. The detector 112 comprises a comparator 201 that includes inputs 202 and 203. Input 202 is an inverting input and receives a threshold voltage OVP2TH. Input 203 is a non-inverting input and couples to the node 119 in FIG. 1. (The voltage at the node 119 is the drain voltage of the MOSFET 108.) An output of the comparator 201 couples to a node 206. The node 206 couples to an input 211 of a blanking circuit 204. An inverting input 205 couples to the gate 109. The blanking circuit 204 has an output 222, which may be logic high if the drain voltage is higher than the threshold voltage, and which may be logic low if the drain voltage is lower than the threshold voltage. The output 222 couples to a set input 223 of a flip-flop 221. The flip-flop 221 has a data input 224 that receives a logic low signal, an inverting clock input 225 that couples to the gate 109, a clear input 226 that is configured to receive a reset signal, and an output 227 that couples to node 228.

The node 206 also couples to an inverting enable input 210 of a time-out timer (or simply, timer) 209. The timer 209 has a clear input 212 that couples to an output 213 of a zero current detector (ZCD) 207. The ZCD 207, in turn, has an input 208 that couples to the drain of the MOSFET 108. The timer 209 has an output 214 that couples to a set input 215 of a flip-flop 216. The flip-flop 216 has a data input 217 that receives a low signal. The flip-flop 216 has an inverting clock input 218 that couples to the gate 109. The flip-flop 216 has a clear input 220 that is configured to receive a reset signal. The flip-flop 216 includes an inverting output 219.

The detector 112 comprises an AND gate 229 that has an input 230 that couples to the inverting output 219. The AND gate 229 also has an input 231 that couples to the node 228. A flip-flop 237 has a data input 238 that couples to the node 228, a set input 243 that receives a logic low, and a clock input 239 that couples to the gate 109. A clear input 240 is configured to receive a reset signal and an output 241 provides a signal REDUCED_ON_TIME. A flip-flop 232 has a data input 233 that couples to the output of the AND gate 229 and a clock input 234 that couples to the gate 109. The flip-flop 232 has a clear input 235 that is configured to receive a reset signal and an output 236 that provides a signal OVP2_FAULT. The flip-flop 232 includes a set input 242 that receives a logic low. The operation of the detector 112 is described below in tandem with the timing diagrams of FIGS. 3-4.

Figure 3:
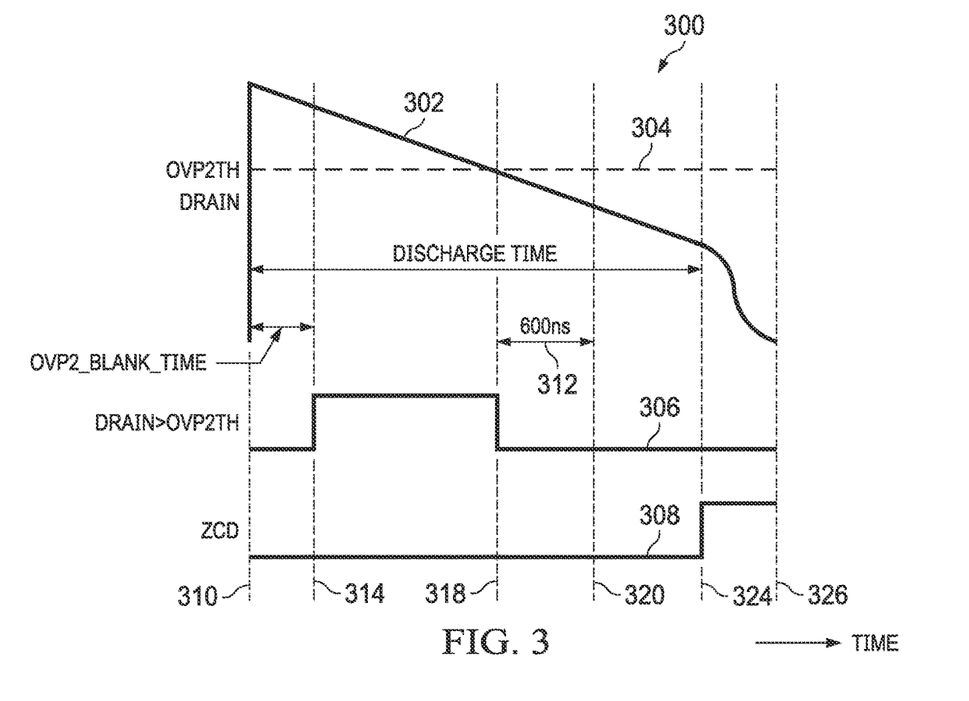
FIGS. 3-6 are timing diagrams describing the behavior of the boost PFC controller detector of FIG. 2, in accordance with an example.

FIG. 3 is a timing diagram 300 describing the behavior of the detector 112 of FIG. 2 for a cold start condition, in accordance with an example. The waveform 302 depicts the drain voltage of the MOSFET 108. The dashed line 304 depicts the threshold voltage received by the comparator 201 on input 202. The waveform 306 depicts the output of the blanking circuit 204. The waveform 306 goes high when the drain voltage exceeds the threshold voltage and goes low when the drain voltage is less than the threshold voltage. An exception to this behavior for the waveform 306 is during the blank time provided by the blanking circuit 204. After the blank time expires (e.g., as determined by a timer within the blanking circuit 204), the output of the comparator 201 is released to the flip-flop 221. Waveform 308 depicts the output 213 of the ZCD 207.

The current in the inductor 106 (FIG. 1) increases when the MOSFET 108 is turned on and decreases when the MOSFET 108 is turned off. Because the activation and deactivation of the MOSFET 108 depends on the signal provided to the gate 109, the aforementioned increases in inductor 106 current coincide with a high gate voltage, while decreases in inductor 106 current coincide with a low gate voltage. At time 310 the gate 109 is switched low, meaning that the inductor 106 current—and, thus, the drain voltage—begins to decrease, as waveform 302 depicts. Because the drain voltage (waveform 302) is higher than the threshold voltage (waveform 304), the signal at node 206 is high. The signal at node 206 is provided to the blanking circuit 204, which is activated when the inverting input 205 goes low as the gate 109 goes low. One reason for the blank time is to remove noise that occurs in the signal at node 206 during switching of the MOSFET 108. After a suitable blank time has been provided, the output 222 goes high, as waveform 306 indicates at time 314.

Because the output 222 is high, input 223 is high, thereby setting the output 227 of flip-flop 221 high. Because input 223 is a set input, the output 227 remains high regardless of changes at input 223, until a falling edge of the voltage at gate 109 is received at input 225, at which time the low signal provided to input 225 is provided at the output 227.

For purposes of the timing diagram 300, the voltage at gate 109 does not experience another falling edge after time 310.

At time 318, the drain voltage (waveform 302) drops below the threshold voltage (dashed line 304). At this time, the output 222 goes low, but as explained above, this has no effect on the output 227 of the flip-flop 221. The output 227 remains high. A consequence of the drain voltage dropping below the threshold voltage, however, is that the input 210 receives a low signal, thereby enabling the timer 209. As numeral 312 indicates, an example duration of the timer 209 is 600 ns. If the ZCD waveform 308 goes high during this time window, a genuine overvoltage condition is identified. However, as explained above, the timing diagram 300 depicts a cold start condition, and so the ZCD 308 goes high at time 324, after the 600 ns time window has expired. Referring to the detector 112 in FIG. 2, at time 318, the output 214 is low, which has no effect on the flip-flop 216. At time 320, the 600 ns time window expires. Because the ZCD signal at clear input 212 remains low and thus has no effect on output 214, the output 214 goes high. Because input 215 is a set input, the received high signal causes the inverted output 219 to go low. Regardless of any further changes to the set input 215, the inverted output 219 will remain low. Thus, as of time 320, the node 228 is fixed high, and the inverted output 219 is fixed low. Accordingly, the input 238 is high, and the input 233 is low. At time 324, the ZCD signal at input 212 rises, but as explained, this has no effect on the output of the flip-flop 216. At time 326, the voltage at gate 109 rises, and this rising edge is provided to clock inputs 239 and 234. As a result, the flip-flops 237, 232 are triggered to capture their inputs 238, 233. Thus, REDUCED_ON_TIME goes high, while OVP2_FAULT goes low. These outputs indicate a cold start condition, meaning that until REDUCED_ON_TIME goes low, the driver 114 should reduce the duty cycle of the system. However, there is not a true overvoltage condition that should cause the MOSFET 109 to be turned off and to remain turned off for an extended period of time.

Figure 4:
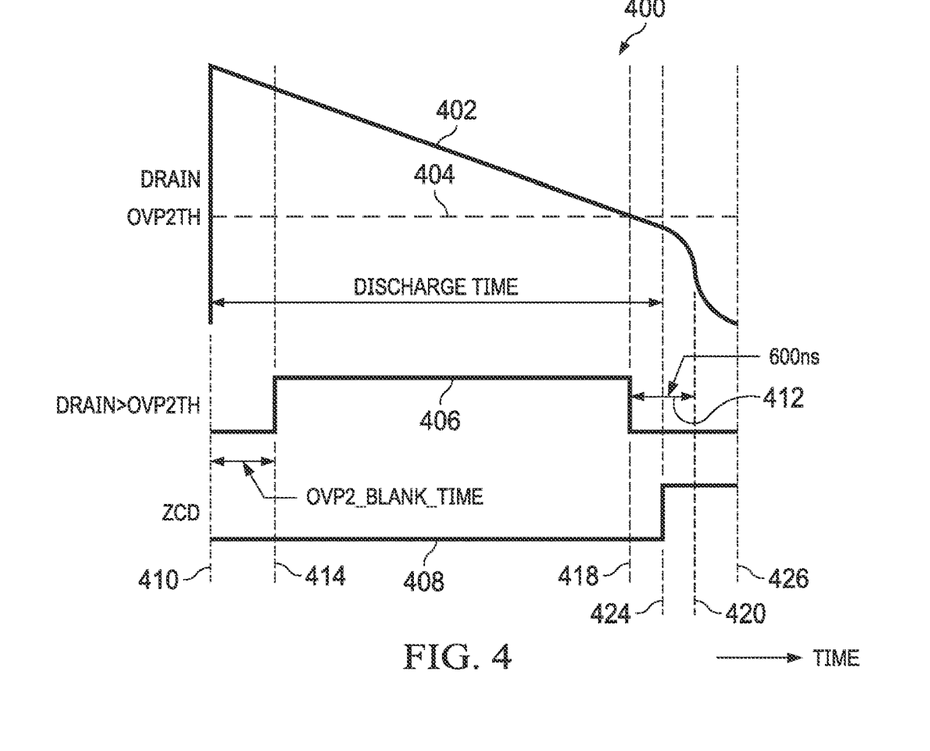

FIG. 4 illustrates a timing diagram 400 that depicts a true overvoltage situation. The timing diagram 400 is virtually identical to the timing diagram 300, with like numerals referring to like waveforms and events within the detector 112. However, the timing diagram 400 differs from the timing diagram 300 in that the ZCD signal goes high during the 600 ns time period started by the timer 209. Specifically, because the drain voltage was at one time higher than the threshold voltage, the output 227 is high, and thus node 228 is high. However, the drain voltage remains above the threshold voltage for a longer period of time than in timing diagram 300, thus triggering the timer 209 at time 418, which is later than is the case in the timing diagram 300. This triggering of the timer 209 is closer to the time that the ZCD 207 detects approximately zero current in the inductor 106 (FIG. 1). Accordingly, the ZCD signal provided at input 212 goes high at time 424, which is within the example 600 ns time window indicated by numeral 412. Because the input 212 goes high prior to expiration of the timer 209, the output 214 remains low. Consequently, the set input 215 remains low, and so the inverting output 219 remains high. Thus, the node 228 is high, as is the inverting output 219. As a result, the input 238 is high, and the input 233 is also high. When the voltage at gate 109 goes high at time 426, REDUCED_ON_TIME goes high and OVP2_FAULT also goes high. Taken together, these signals indicate a true overvoltage condition. In response, the driver 114 may adjust the signal provided to the gate 109 to reduce the duty cycle and/or to shut off the MOSFET 108 for an extended, predetermined period of time.

Figure 5:
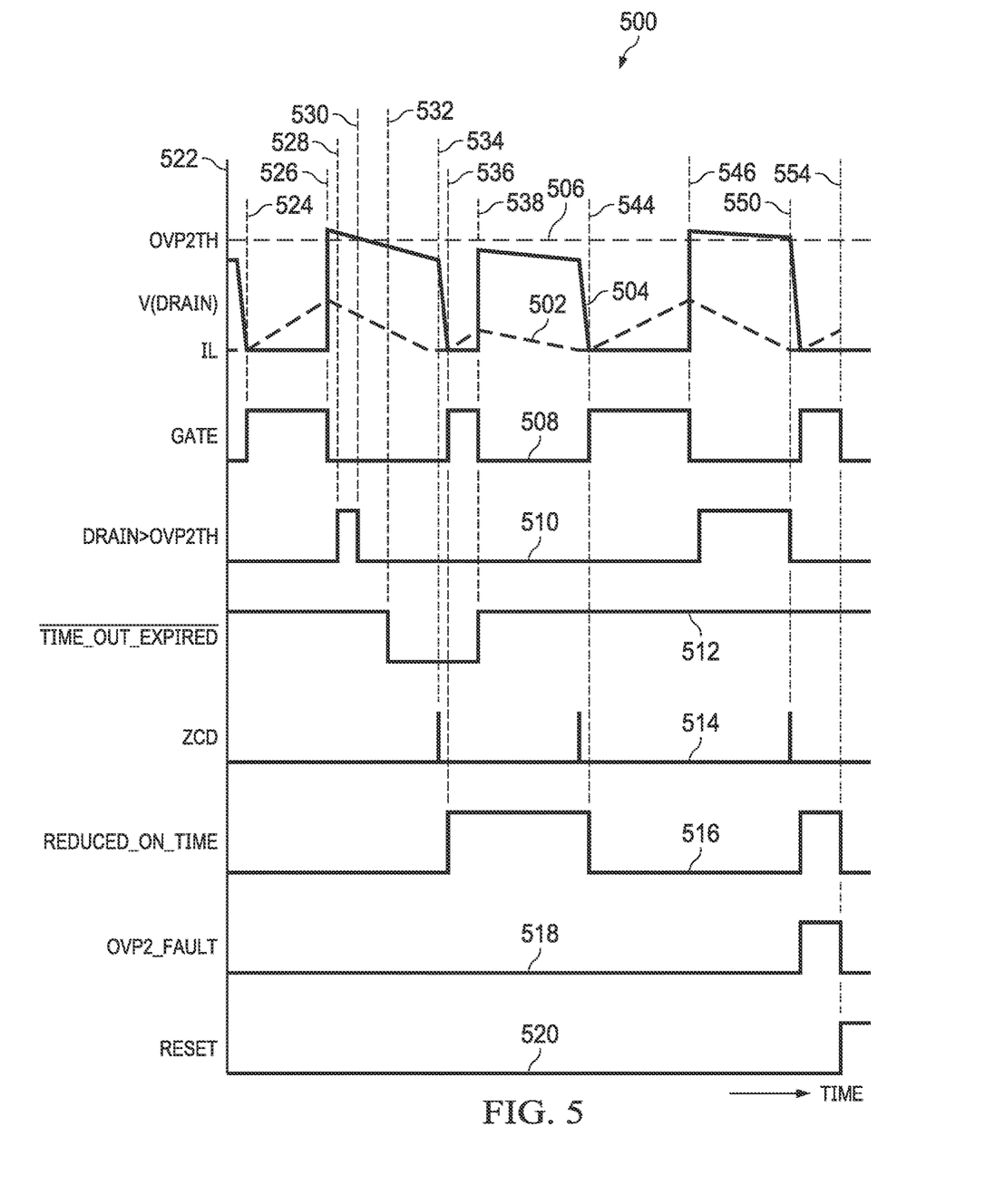

FIG. 5 includes a timing diagram 500 that depicts a variety of situations for the system 100. The timing diagram 500 includes an inductor 106 current waveform 502, a drain voltage waveform 504, a threshold voltage dashed line 506, a gate voltage waveform 508, a waveform 510 depicting the output 222, a waveform 512 depicting the output 219, and a waveform 514 depicting the output 213. The timing diagram 500 also includes a waveform 516 depicting the signal REDUCED_ON_TIME, a waveform 518 depicting the signal OVP2_FAULT, and a waveform 520 depicting the RESET signal provided to the inputs 220, 226, 235, and 240.

At time 522, the drain voltage is rapidly falling to zero, at which time the inductor 106 current is approximately zero. At time 524, the voltage at gate 109 goes high (waveform 508). This causes the MOSFET 108 to turn on, which in turn causes the inductor 106 current to rise and the drain voltage to remain approximately zero. At time 526, the voltage at gate 109 goes low. This causes the drain voltage and inductor 106 current to begin decreasing. At time 528, after a blank time, the output 222 (waveform 510) goes high and remains high until the drain voltage drops below the threshold voltage at time 530. Although short-lived, this rise in the output 222 causes the output 227 to go high and to remain high. When the drain voltage drops below the threshold voltage at time 530, the timer 209 is triggered. The timer 209 expires at time 532, at which time the output 214 (waveform 512) goes high. (Had the ZCD output 213 been asserted before the timer 209 expired at time 532, the output 214 would not have gone high, but that is not the case for this situation.) Because output 214 goes high, the set input 215 also goes high, thereby causing the inverted output 219 to be low and to remain low. As a result of the output 227 being high and the inverted output 219 being low, the input 238 is high and the input 233 is low. The ZCD output 213 (waveform 514) goes high at time 534, but this is of no consequence, since the flip-flop 216 has already been set high. At time 536, the voltage at gate 109 rises (waveform 508), thus causing the flip-flops 237 and 232 to capture their respective inputs. Thus, at time 536, the REDUCED_ON_TIME signal (waveform 516) goes high, and the OVP2_FAULT signal (waveform 518) remains low. Thus, the drain voltage behavior that began at time 526 and ended at time 536 represented a cold start condition. Appropriate action is taken by the driver 114, as described above. For example, the duty cycle of the system may be reduced, which is reflected in the decreased duration of time for which the voltage at gate 109 is high in the next cycle (times 536 to 538). The reset signal (waveform 520) may be asserted at time 554 to clear the flip-flops.

While the voltage at gate 109 is high, the drain voltage is low, and the inductor 106 current is rising. At time 538, the voltage at gate 109 drops to low, thus causing the drain voltage to quickly rise and begin to fall, and likewise causing the inductor 106 current to begin to fall. However, unlike the preceding cold start condition, the drain voltage behavior between times 538 and 544 represents normal operation, since the drain voltage does not exceed the threshold voltage. When the voltage at gate 109 falls (time 538), the flip-flops 221, 216 capture their respective inputs 224, 217, which are both low. Thus, the output 227 is low and the inverted output 219 is also low, while the outputs 241 and 236 remain unchanged since they are altered by rising edge gate signals. As a result of the outputs 227, 219 being low, the input 238 is low and the input 233 is low. When the voltage at gate 109 rises at time 544, the signals at inputs 238, 233 are captured and output in the form of low REDUCED_ON_TIME and OVP2_FAULT signals. The driver 114 receives these signals and takes appropriate action. For example, the driver 114 may increase the duty cycle of the system, as is indicated in the increased duration of the gate pulse starting at time 544.

At time 546, the voltage at gate 109 goes low, causing the outputs 227, 219 to go low and high, respectively. The drain voltage rises above the threshold voltage, causing the output 227 to rise. When the drain voltage drops below the voltage threshold at time 550, the timer 209 is started. Because the ZCD output 213 goes high before the timer expires, the clear input 212 receives a high signal, thus causing the output 214 to remain low, even after the timer 209 expires. Thus, the output 219 remains high. Because the output 219 is high and the node 228 is high, the inputs 238, 233 are high. When the voltage at gate 109 drops at time 554, the inputs 238, 233 are captured, and the REDUCED_ON_TIME and OVP2_FAULT signals are both high. This indicates that there is a genuine overvoltage situation, and the driver 114 takes appropriate action. For example, the driver 114 shuts off the MOSFET 108 for an extended, predetermined length of time, and after re-starting the MOSFET 108, the driver 114 reduces the duty cycle.

Figure 6:
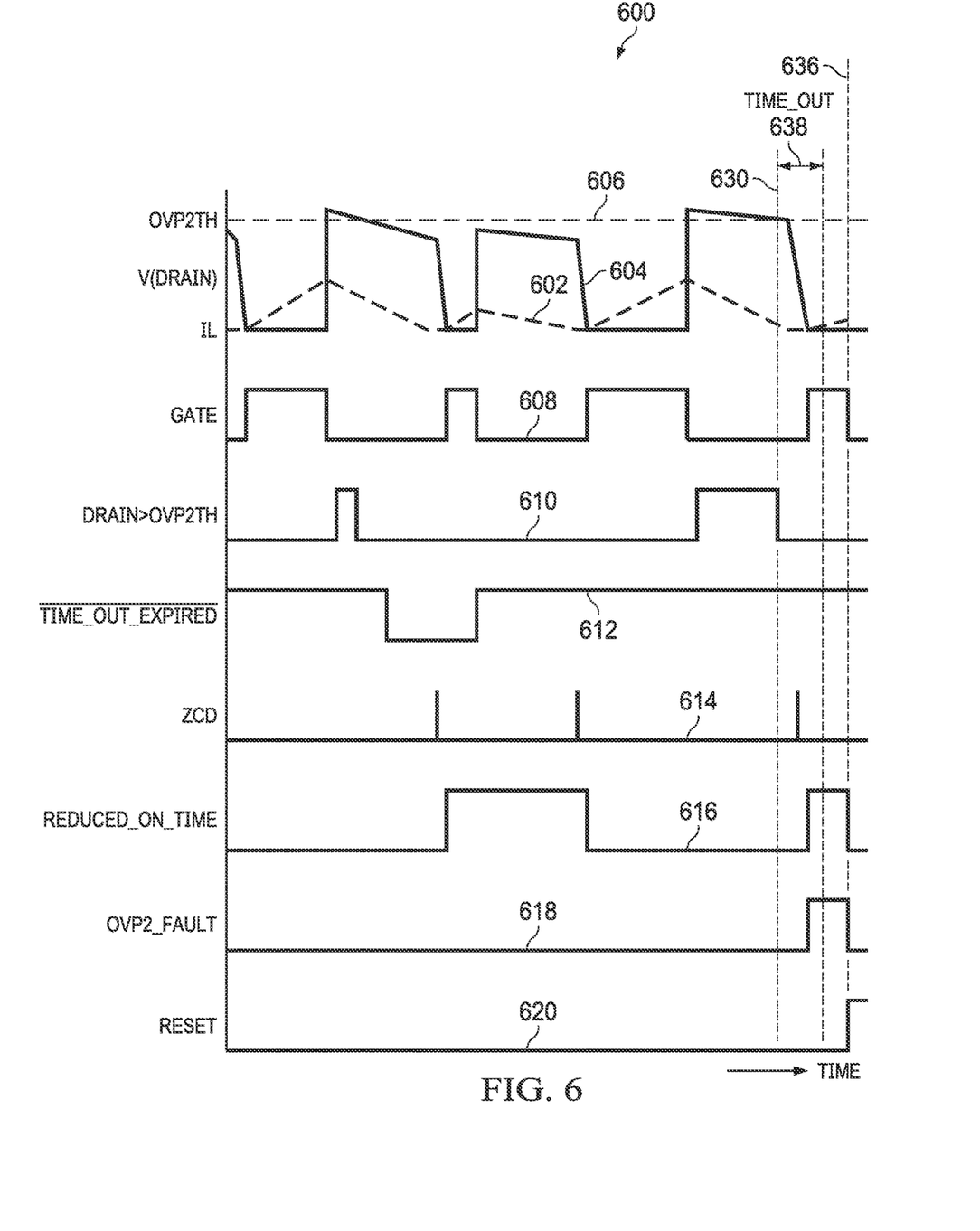

FIG. 6 is virtually identical to FIG. 5, with like waveform numerals referring to like waveforms. However, the drain voltage behavior starting at time 624 exhibits a drop below the voltage threshold with a slightly different timing than has been described in FIG. 5. Because the drain voltage exceeds the threshold voltage, the output 227 and the node 228 go high. At time 630, the drain voltage drops below the threshold voltage, thus triggering timer 209. Numeral 638 depicts the time window within which the ZCD output 213 goes high (waveform 614), thus resulting in the set input 215 remaining low, and the inverted output 219 remaining high. As a result, the input 237 is high and the input 233 is also high. At time 636, the voltage at gate 109 falls, and this falling edge causes the inputs 237, 233 to be captured and output as a high REDUCED_ON_TIME signal and a high OVP2_FAULT signal. The driver 114 receives these signals and takes appropriate action. For example, the driver 114 may shut off the MOSFET 108 for an extended, predetermined amount of time, and after restarting the MOSFET 108, the driver 114 may lower the duty cycle.

Figure 7:
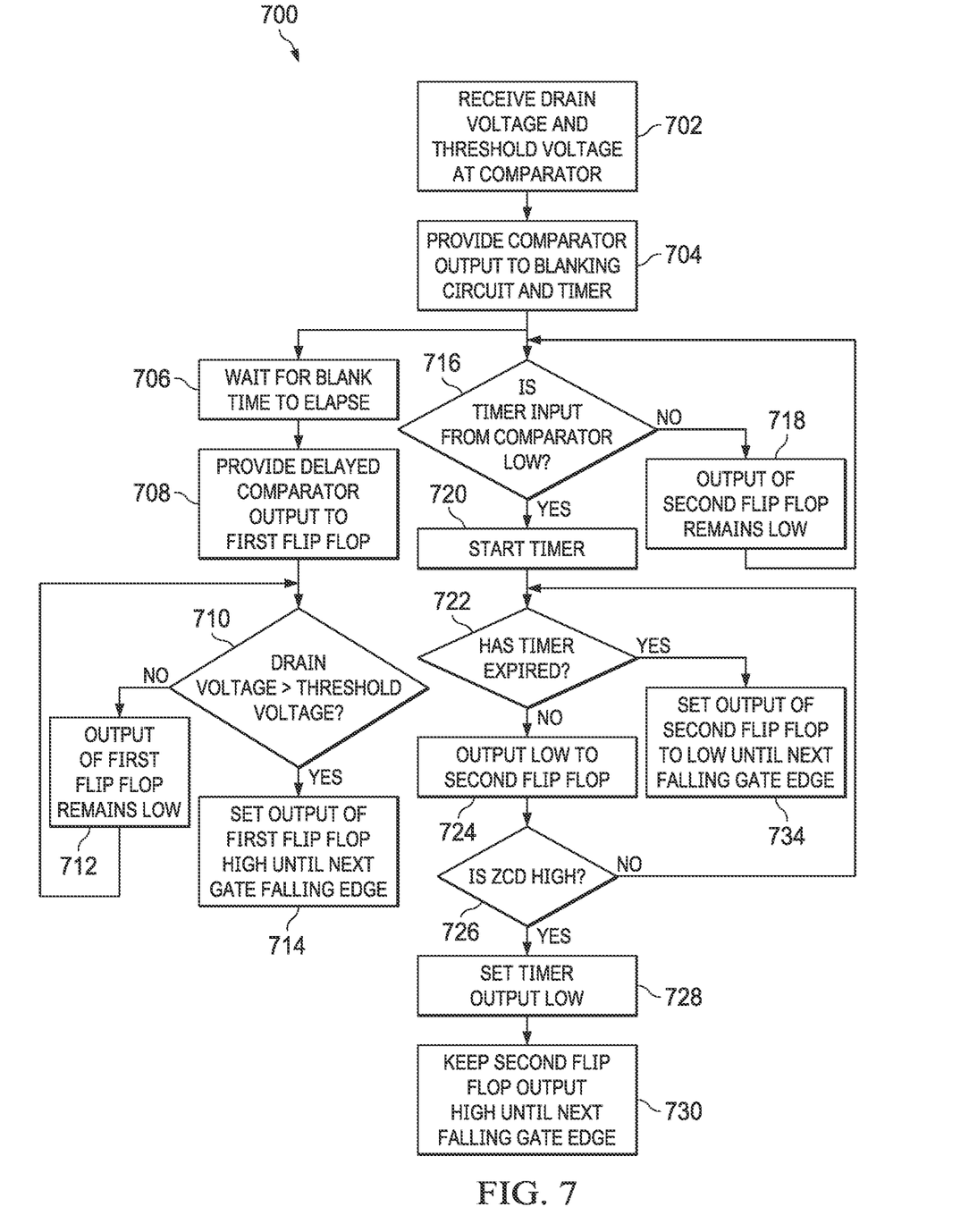
FIG. 7 is a flow diagram describing a method of operation for the boost PFC controller detector of FIG. 2, in accordance with an example.

FIG. 7 depicts a flow diagram of a method 700 in accordance with examples. The method 700 describes the operation of the detector 112. The method 700 begins with receiving a drain voltage and a threshold voltage at a comparator, such as comparator 201 (702). The method 700 next includes providing the comparator output to a blanking circuit (e.g., blanking circuit 204) and timer (e.g., timer 209) (704). The method then comprises waiting for the blank time to elapse (706) and providing the comparator output to a first flip-flop, such as flip-flop 221 (708). The method 700 further comprises determining whether the drain voltage is greater than the threshold voltage (710). If not, the method comprises providing a low output from the first flip-flop 221 (712). Control of the method then returns to 710. Otherwise, the method 700 comprises setting the output of the first flip-flop 221 high until the next falling edge of the voltage at the gate 109 (714).

Some or all of steps 716-732 are performed in parallel with some or all of steps 706-714, since these two groups of steps represent different pathways in the detector 112. The method 700 comprises determining whether the timer (e.g., timer 209) receives a low comparator input (716). If not, the method comprises providing a second flip-flop (e.g., flip-flop 216) output that remains low (718) and returning control of the method to 716. Otherwise, the method 700 comprises starting the timer 209 (720) and determining whether the timer has expired (722). If not, the method 700 comprises providing a low output from the second flip-flop 216 (724) and determining whether the ZCD output (e.g., output 213) is high (726). If not, control of the method returns to 722. Otherwise, if the ZCD output 213 is high (726), the method 700 comprises setting the timer 209 output 214 low (728), and keeping the output of the second flip-flop 216 high until the next falling edge of the voltage at gate 109 (730). If, however, the timer has expired (722), the method 700 comprises setting the output of the second flip-flop 216 to low until the next falling edge of the voltage at gate 109 (734). The method 700 describes the operation of detector 112 up to the flip-flops 221 and 216. The circuitry downstream of these flip-flops (e.g., AND gate 229 and flip-flops 232, 237) operate as follows. The AND gate 229 provides an output based on the outputs of the flip-flops 221, 216. At the next rising edge of the voltage at gate 109, the inputs at flip-flops 237, 232 are captured and used to generate the signals REDUCED_ON_TIME and OVP2_FAULT.

Figures 8, 9:
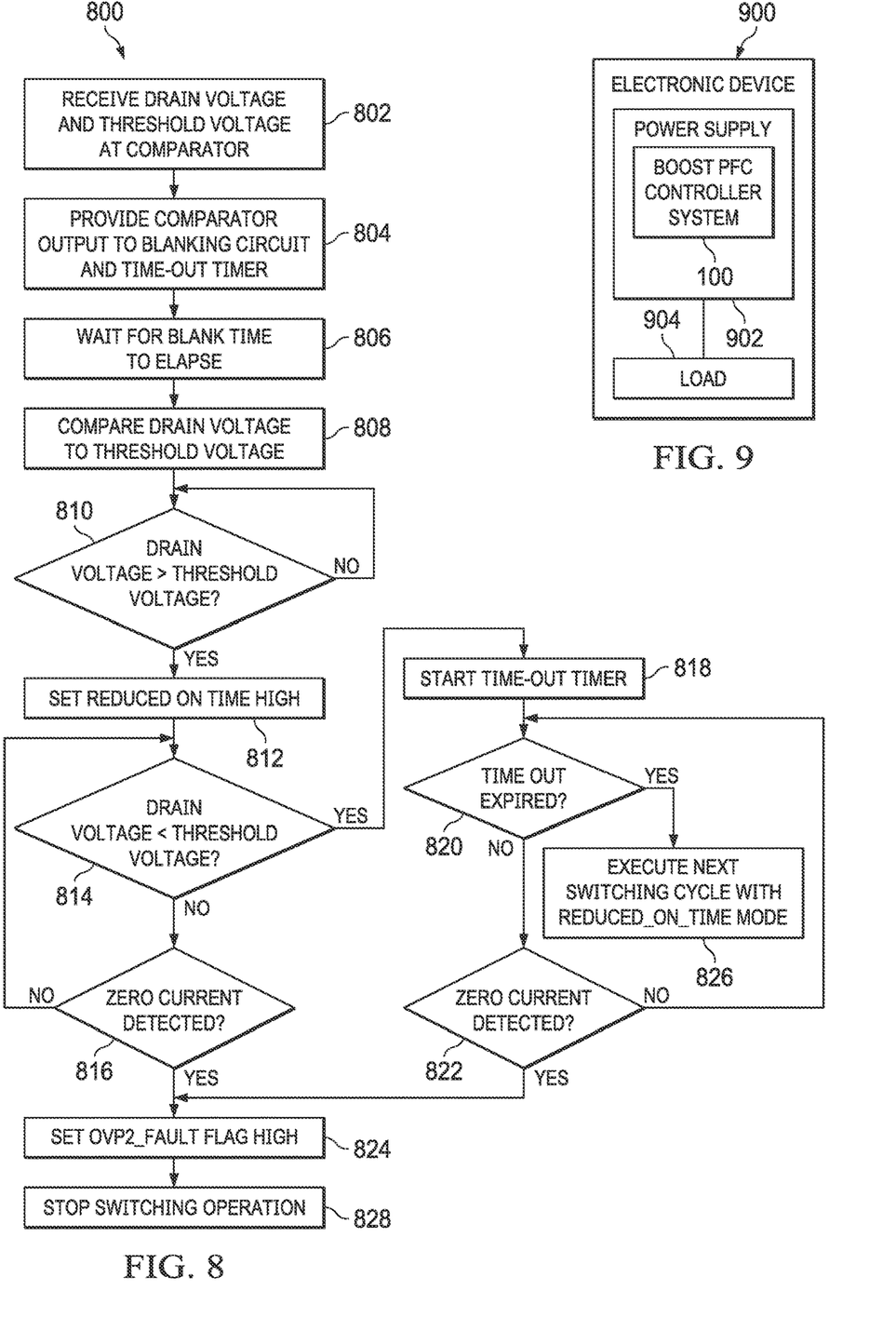
FIG. 8 is a flow diagram describing a method associated with the boost PFC controller detector of FIG. 2, in accordance with an example.
FIG. 9 is a block diagram of an electronic device comprising a boost PFC converter system, in accordance with an example.

FIG. 8 depicts a flow diagram of a method 800 associated with the detector 112 of FIG. 2. The method 800 begins by receiving a drain voltage and a threshold voltage at the comparator (802). The method 800 comprises providing the comparator output to a blanking circuit and timer (804). The method 800 next includes waiting for the blank time of the blanking circuit to elapse (806) and comparing the drain voltage to the threshold voltage (808). The method 800 comprises determining whether the drain voltage is greater than the threshold voltage (810). If not, 810 is repeated. However, if the drain voltage is greater than the threshold voltage, the method 800 comprises setting the REDUCED_ON_TIME output (e.g., output of the flip-flop 237 in FIG. 2) high (812). The method 800 then comprises determining whether the drain voltage is less than the threshold voltage (814). If not, the method 800 comprises determining whether a zero current (ZCD) is detected in the inductor (e.g., inductor 106 in FIG. 1) (816). If not, 814 repeats. Otherwise, the method 800 comprises setting OVP2_FAULT high (824) and then stopping the switching operation of the MOSFET (e.g., MOSFET 108) (828). If, at 814, the drain voltage is less than the threshold voltage, the method 800 comprises starting the timer (818) and determining whether the timer has expired (820). If it has not expired, the method 800 comprises determining whether a zero current has been detected in the inductor (822). If not, 820 is repeated, but if so, 824 is performed. If, at 820, it is determined that the timer has expired, the method 800 comprises executing the next switching cycle with a reduced on-time, e.g., reducing the duty cycle (826).

FIG. 9 is a block diagram of an electronic device 800 comprising a boost PFC converter system 100, in accordance with an example. Specifically, the electronic device 900 (e.g., a mobile device, an automobile subsystem, or any other powered device) comprises a power supply 902 including the boost PFC converter system 100 and a load 904 supplied by the power supply 902.

In the foregoing discussion and in the claims, the terms "including" and "comprising" are used in an open-ended fashion, and thus should be interpreted to mean "including, but not limited to . . . ." An element or feature that is "configured to" or "to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A process of operating a circuit having a transistor with a drain coupled to an inductor, the process comprising:
   providing a drain voltage and a threshold voltage to first and second inputs of a comparator having a comparator output;
   configuring the comparator to:
      set the comparator output at a first level responsive to the drain voltage being greater than the threshold voltage; and
      setting the comparator output at a second level responsive to the drain voltage being less than the threshold voltage;
   providing the comparator output to an input of a blanking circuit, wherein the blanking circuit has a blanking circuit output;
   coupling a timer circuit to the blanking circuit output, wherein the timer circuit includes a timer;
   starting the timer for a timer period responsive to the first level changing to the second level;
   sensing a current at the drain using a zero current detection circuit providing a zero current detection output signal in response to sensing a zero current through the drain;
   setting an overvoltage signal responsive to the zero current detection output signal occurring during the timer period; and
   setting a reduced on time of the transistor responsive to the zero current detection output signal occurring after the timer period expires.

2. The process of claim 1 including, blanking an output of the comparator transitioning from the second level to the first level responsive to the drain voltage being greater than the threshold voltage.

3. The process of claim 1 in which the setting an overvoltage signal includes turning off the transistor.

4. The process of claim 1 in which the setting a reduced on time of the transistor includes reducing a duty cycle of the circuit.

5. The process of claim 1 including operating a power converter.

6. The process of claim 1 including operating a boost power factor correction circuit.

7. The process of claim 1 wherein the timer period is 600 nanoseconds.

8. The process of claim 1 in which sensing a zero current includes sensing a current between +5 milliamps and −5 milliamps.

9. The process of claim 1 in which sensing a zero current includes sensing a current between +1 milliamp and −1 milliamp.

10. The process of claim 1 including increasing the drain voltage by turning off the transistor.

11. The process of claim 1 including applying voltage to or removing voltage from a gate of the transistor to turn the transistor on or off.

12. The process of claim 1 including applying voltage to and removing voltage from a gate of the transistor to turn the transistor on and off to set a duty cycle of the circuit.

13. The process of claim 1 including applying a reset signal to the circuit to reset the overvoltage signal.

14. The process of claim 1 including applying a reset signal to the circuit to reset the reduced on time of the transistor.

\* \* \* \* \*

UNITED STATES PATENT AND TRADEMARK OFFICE
CERTIFICATE OF CORRECTION

PATENT NO. : 11,671,006 B2
APPLICATION NO. : 17/232974
DATED : June 6, 2023
INVENTOR(S) : Joseph Michael Leisten et al.

It is certified that error appears in the above-identified patent and that said Letters Patent is hereby corrected as shown below:

On the Title Page

Related U.S. Application Data, change:
(60) from "Provisional application No. 61/632,478, filed on Jan. 24, 2012." to "Provisional application No. 62/632,478, filed on February 20, 2018."

Signed and Sealed this
Twentieth Day of August, 2024

Katherine Kelly Vidal
*Director of the United States Patent and Trademark Office*